United States Patent
Koppal et al.

(10) Patent No.: US 10,440,348 B2
(45) Date of Patent: Oct. 8, 2019

(54) OPTICAL PRIVATIZING DEVICE, SYSTEM AND METHOD OF USE

(71) Applicant: UNIVERSITY OF FLORIDA RESEARCH FOUNDATION, INCORPORATED, Gainesville, FL (US)

(72) Inventors: Sanjeev Jagannatha Koppal, Gainesville, FL (US); Francesco Pittaluga, Gainesville, FL (US)

(73) Assignee: University of Florida Research Foundation, Inc., Gainesville, FL (US)

(*) Notice: Subject to any disclaimer, the term of this patent is extended or adjusted under 35 U.S.C. 154(b) by 180 days.

(21) Appl. No.: 15/561,251

(22) PCT Filed: Mar. 24, 2016

(86) PCT No.: PCT/US2016/023927
§ 371 (c)(1),
(2) Date: Sep. 25, 2017

(87) PCT Pub. No.: WO2016/154392
PCT Pub. Date: Sep. 29, 2016

(65) Prior Publication Data
US 2018/0063509 A1    Mar. 1, 2018

Related U.S. Application Data

(60) Provisional application No. 62/137,655, filed on Mar. 24, 2015.

(51) Int. Cl.
*H04N 13/254*    (2018.01)
*H04N 5/228*    (2006.01)
(Continued)

(52) U.S. Cl.
CPC ........ *H04N 13/254* (2018.05); *A63F 13/213* (2014.09); *H04N 5/2254* (2013.01);
(Continued)

(58) Field of Classification Search
CPC ............. H04N 13/254; H04N 13/0239; H04N 13/025; H04N 13/0253; H04N 13/0257;
(Continued)

(56) References Cited

U.S. PATENT DOCUMENTS 7,728,906 B2   6/2010   Bilbrey
8,123,622 B1   2/2012   Young et al.
(Continued)

FOREIGN PATENT DOCUMENTS

WO    20130144966 A1   10/2013

OTHER PUBLICATIONS

Emily Gera, "Kinect cover offers '100 percent privacy' for Xbox One users—Polygon", Nov. 14, 2013, https://www.polygon.com/2013/11/14/5103466/kinect-cover-offers-100-percent-privacy-for-xbox-one-users/corment/198145407 (Year: 2013).*

(Continued)

*Primary Examiner* — Christopher S Kelley
*Assistant Examiner* — Asmamaw G Tarko
(74) *Attorney, Agent, or Firm* — Timothy H. Van Dyke; Beusse, Wolter, Sanks & Maire, PLLC

(57) ABSTRACT

Embodiments are directed to an optical privatizing device (100), system and methods of use. The device includes a removable frame (101) removably attachable to a sensor housing (1A). A device includes a blurring lens (130) coupled to the removable frame (101) and configured to optically modify light passing to a depth sensor wherein the optical modified light has a privatizing blur level to neutralize a profile of an object sensed by the depth sensor (Continued)

within a working volume of the depth sensor to an unidentifiable state while maintaining a depth parameter sensed by the depth sensor.

12 Claims, 6 Drawing Sheets

(51) Int. Cl.
*H04N 5/225* (2006.01)
*A63F 13/213* (2014.01)
*H04N 13/257* (2018.01)
*H04N 13/25* (2018.01)
*H04N 13/239* (2018.01)

(52) U.S. Cl.
CPC ......... *H04N 5/2258* (2013.01); *H04N 13/239* (2018.05); *H04N 13/25* (2018.05); *H04N 13/257* (2018.05)

(58) Field of Classification Search
CPC .. H04N 5/2254; H04N 5/2258; H04N 13/239; H04N 13/25; H04N 13/257; A63F 13/213
USPC .......................................................... 348/42
See application file for complete search history.

(56) References Cited

U.S. PATENT DOCUMENTS

| | | | | |
|---|---|---|---|---|
| 9,179,105 | B1* | 11/2015 | Zeira | H04N 5/2254 |
| 2011/0037832 | A1* | 2/2011 | Gharib | G02B 7/34 |
| | | | | 348/46 |
| 2011/0058255 | A1* | 3/2011 | Weiss | H04M 1/0264 |
| | | | | 359/511 |
| 2013/0050549 | A1* | 2/2013 | Bilbrey | G06F 1/1605 |
| | | | | 348/294 |
| 2013/0142394 | A1* | 6/2013 | Li | G06T 7/571 |
| | | | | 382/106 |
| 2014/0176663 | A1 | 6/2014 | Cutler et al. | |
| 2014/0293425 | A1* | 10/2014 | Juhola | G02B 5/1895 |
| | | | | 359/571 |
| 2014/0299775 | A1* | 10/2014 | Kimmel | G06K 9/00771 |
| | | | | 250/341.8 |
| 2015/0009399 | A1* | 1/2015 | Jonsson | G06F 1/1656 |
| | | | | 348/373 |
| 2015/0098625 | A1* | 4/2015 | Lu | G06F 19/3481 |
| | | | | 382/107 |
| 2016/0205380 | A1* | 7/2016 | Inoue | G06T 7/73 |
| | | | | 348/46 |
| 2016/0266607 | A1* | 9/2016 | Varsanik | G06F 1/1605 |

OTHER PUBLICATIONS

Koppal, Sanjeev J. et al., "Towards Wide-angle Microvision Sensors," IEEE Transactions on Pattern Analysis and Machine Intelligence, vol. 35, No. 12, Dec. 2013.
Gera, Emily, "Kinect cover offers '100 percent privacy' for Xbox One users", Polygon, Nov. 2013 (http://www.polygon.com/2013/11/14/5103466/kinect-cover-offers-100-percent-privacy-for-xbox-one-users).
"Genuine Marumi Soft Spot Blur Effect Filter 67mm EU STOCK Trackable Shipping", ebay, Jan. 2015 (http://www.ebay.com/itm/Geniune-Marumi-Soft-Spot-Blur-Effect-Filter-67mm-EU-STOCK-Trackable-Shipping-/221632891801/pt+LH_DefaultDomain_0&hash-item339a598b99), 4 pages.
Nakashima, S. et al., "Development of privacy-preserving sensor for person detection", Procedia Social and Behavioral Sciences, 2010, vol. 2, pp. 213-217.
http://www.amazon.com/Pritect-Sensor-Xbox-360-Windows-Kinect/dp/B0054NROWU/ref=cm_cr_pr_pb_t , 3 pages.
"Privacy Cover Camera Lens Cover for Xbox One", http://www.unigamesity.com/wp-content/uploads//2013/11/privacy-cover, 1 page.
International Search Report and Written Opinion for PCT/US2016/023927; Aug. 10, 2016, 9 pages.

* cited by examiner

RGB (Black-out)

IR (Defocus)

Face Closeup

Depth & Tracking

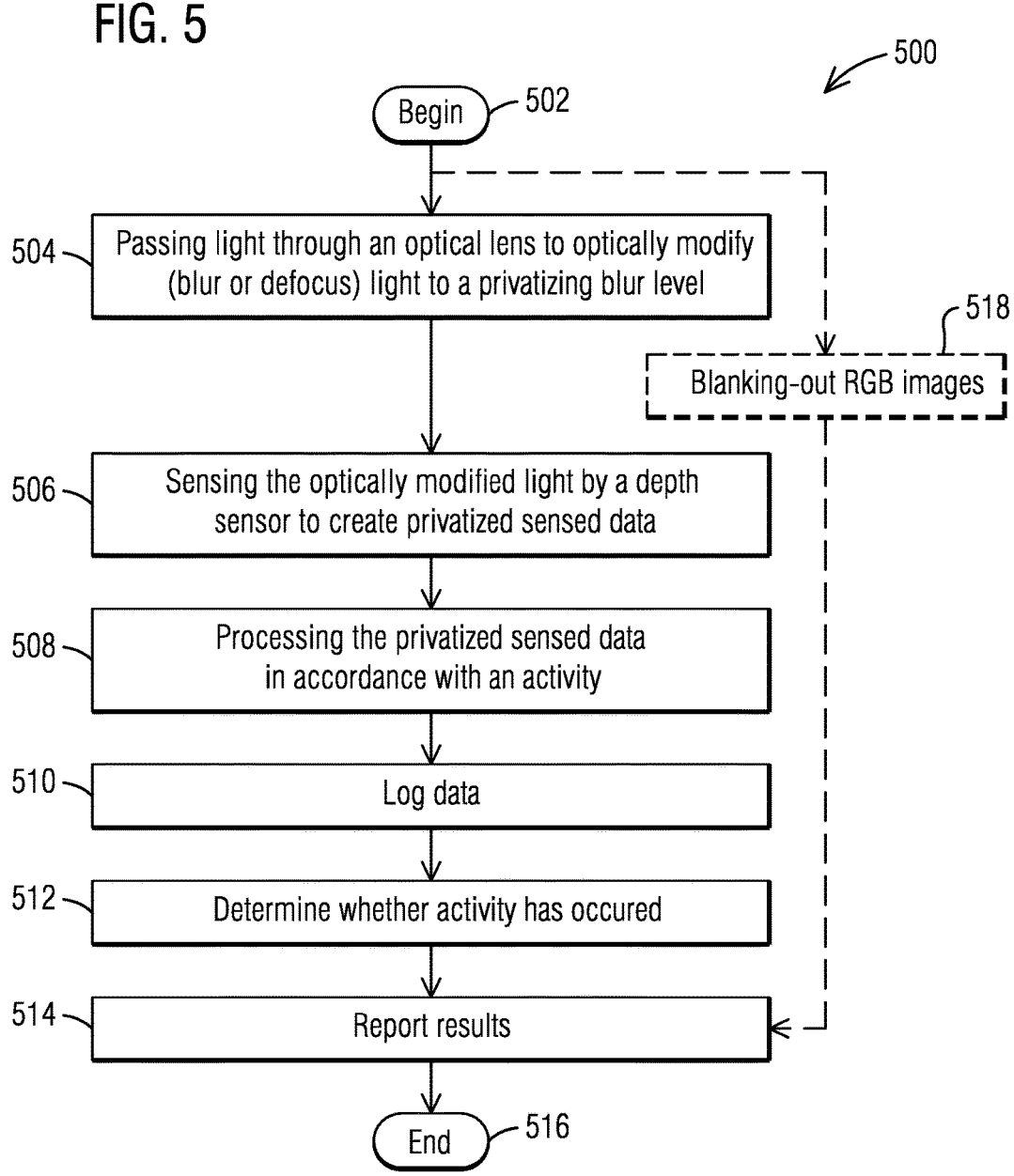

US 10,440,348 B2

OPTICAL PRIVATIZING DEVICE, SYSTEM AND METHOD OF USE

CROSS-REFERENCE TO RELATED APPLICATIONS

This application claims benefit of U.S. Provisional Application No. 62/137,655 filed Mar. 24, 2015, incorporated herein by reference as if set forth in full below.

BACKGROUND

Embodiments relate to an optical privatizing device, system and methods of use.

The Microsoft® Kinect® sensor device includes an RGB (red, green, blue) camera, time-of-flight depth sensor and microphone array. The Microsoft® Kinect® sensor device is configured to capture full body motion, images including faces, hand gestures and more. There are concerns over remote access to the sensors of and/or stored data in the Microsoft® Kinect® sensor device without permission or knowledge by the consumer. Some consumers have concerns relating to their privacy when playing the device or when the device is inactive.

Other sensor devices are used for clinical or industrial applications. However, there is concern for privacy as the sensor information is collected and stored.

SUMMARY

Embodiments herein relate to an optical privatizing device, system and method of use. An aspect of the embodiments include a device comprising: a removable frame removably attachable to a sensor housing; and a blurring lens coupled to the removable frame and configured to optically modify light passing to a depth sensor. The optical modified light has a privatizing blur level to neutralize a profile of an object sensed by the depth sensor within a working volume of the depth sensor to an un-identifiable state while maintaining a depth parameter sensed by the depth sensor.

Another aspect of the embodiments include a system comprising: an optical privatizing device and a multi-sensor device having a depth sensor with a working volume and a red, green, blue (RGB) sensor. The optical privatizing device includes: a frame comprising first aperture to pass light to the RGB sensor and a second aperture; a blurring lens coupled to the second aperture and to optically modify light to the depth sensor to a privatizing blur level to neutralize a profile of an object sensed by the depth sensor within the working volume to an un-identifiable state while maintaining a depth parameter sensed by the depth sensor. A panel selectively coupled to the frame closes the first aperture to blank-out the RGB sensor of the multi-sensor device while the blurring lens simultaneously optically modifies the light passing through the blurring lens.

Another aspect of the embodiments include a method of privately determining an activity, the method comprising: a) passing light through an optical blurring lens of an optical privatizing device to optically modify light to a privatizing blur level to neutralize a profile of an object to an unidentifiable state; b) sensing, by a depth sensor within a working volume of the depth sensor, a depth parameter associated with the optically modified light to create privatized sensed data of the object within the working volume; c) storing the privatized sensed data into a memory device; d) repeating a) through c) over a period of time; and e) processing, by a computing device, the privatized sensed data over the period of time to determine an activity.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which:

FIG. 5 illustrates a computer-implemented method of privatizing activity detection.

DETAILED DESCRIPTION

Figure 1A:
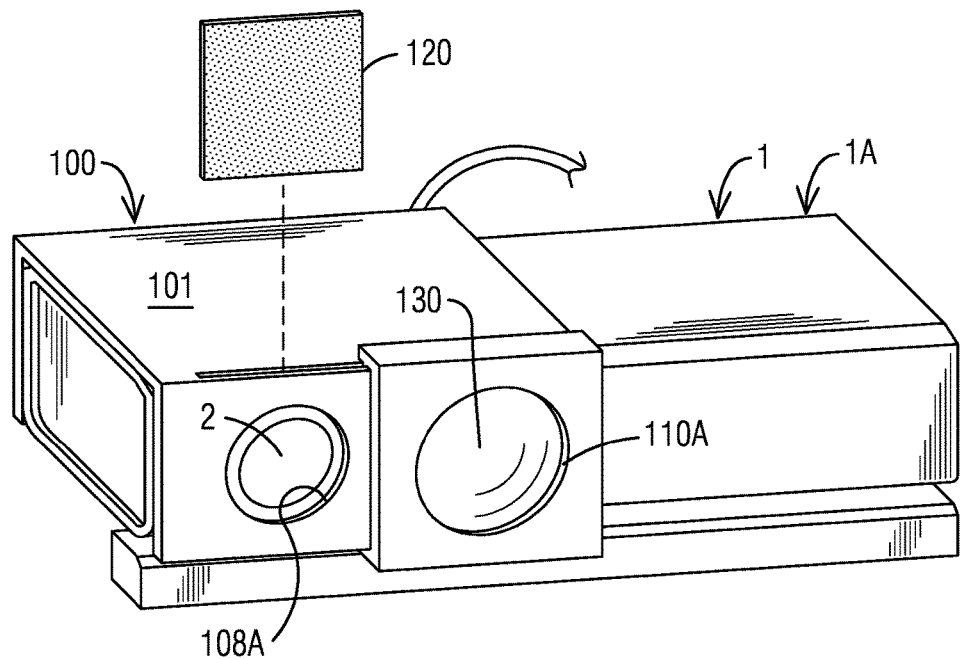
FIG. 1A illustrates an optical privatizing device installed on a multi-sensor device with a blank-out panel removed.

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

The terms front, back and side are only used as a frame of reference for describing components herein and are not to be limiting in any way.

Figure 1B:
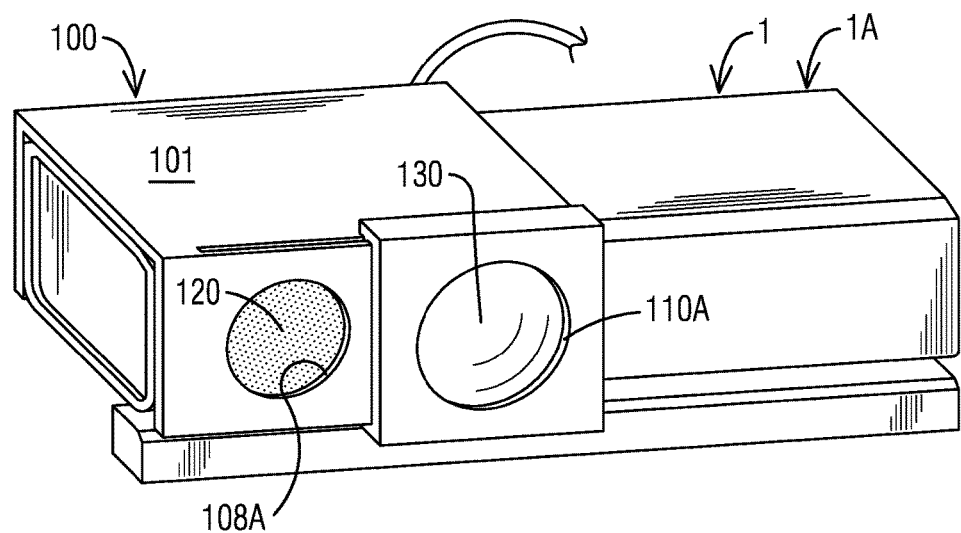
FIG. 1B illustrates an optical privatizing device installed on a multi-sensor device with the blank-out panel installed.

FIGS. 1A and 1B illustrate an optical privatizing device 100 installed on a multi-sensor device 1 with a blank-out panel 120 removed and installed, respectively. The optical privatizing device 100 may include a frame 101 (FIGS. 2A and 2B) having side-by-side light passages or apertures 108A and 110A (FIG. 2B). In an embodiment, light passage or aperture 108A may be configured to be selectively closed via blank-out panel 120. The blank-out panel 120 may be a black-out panel placed in-line with a camera of the multi-sensor device 1 (such as, a video gaming device). The light passage or aperture 108A may be concentric with lens 2 (FIG. 1A) of a camera of the multi-sensor device 1 in housing 1A.

In an embodiment, the light passage or aperture 110A (FIG. 2A) may be configured to pass light though the light passage or aperture 110A by a blurring lens 130 such that the image is blurred to a privatizing blur level. The blurring lens 130 may be a defocused convex infrared (IR) lens. The terms blurred, blurring and blur and defocused, defocusing and defocus may be used interchangeably herein.

The device 100 may be configured with optical defocusing or blurring without the need for a power source or without drawing on any on-board power source of a sensor or computing device. The device 100 may be powerless and may be devoid of any electronics. The device may not include a battery.

The optical privatizing device 100 may be configured to de-identify faces via a blurring lens 130 in-line with the time-of-flight depth sensor of the multi-sensor device 1. The optical privatizing device 100 may allow any image captured by a depth sensor to be profile neutral such that the facial features, race, age, and/or sex may be rendered unidentifiable at the time of capture of the sensor.

In an embodiment, the optical privatizing device 100 may render unidentifiable other thermal objects or objects emitting a thermal identifiable profile. The optical privatizing device 100 may be configured to de-identify thermal emitting objects. Other thermally emitting objects may include gaming devices, vehicles, etc.

Returning now to FIG. 1A, the multi-sensor device 1 may comprise an RGB sensor or RGB camera (not shown) having a lens 2. The multi-sensor device 1 may comprise a time-of-flight depth sensor or infrared-based depth sensor (not shown) adjacent to the RGB camera. The time-of-flight sensor or depth sensor may detect infrared images.

Returning now to FIG. 1A, the blank-out panel 120 is shown lifted from its slot or holder, as will be discussed later.

The panel 120 is shown as the color black but may be any color. The panel 120 may be made of solid material to prevent light from passing therethrough. The optical privatizing device 100 may be configured to optically blank-out or black-out the RGB sensor or camera and, simultaneously, optically defocus light to the infrared (IR) depth sensor.

In an embodiment, the optical privatizing device 100 may be configured to cover the red, green, blue (RGB) sensor or camera. Specifically, the panel 120 when installed may be in-line with the optical aperture of the RGB sensor or camera to block any passage of light to the RGB sensor or camera. Thus, the image captured by the RCG sensor or camera will be blanked out. The image captured may be blanked out and form an image representative of the color of the panel 120. In general, the blank-out panel 120 is a cover for a RGB sensor or camera.

The multi-sensor device 1 includes an RGB (red, green, blue) camera, depth sensor and microphone array. The multi-sensor device 1 is configured for full body motion capture. The multi-sensor device includes software configured to perform full-body three-dimensional (3D) motion capture for interacting the gaming applications. The multi-sensor device includes software configured for facial recognition or recognition of thermally emitting objects.

By way of a non-limiting example, the optical privatizing device 100 when installed on a multi-sensor device 1 or other depth sensor device privatizes detected activities. For example, privatizing may include de-identification of faces, anatomy, skin, hair, eyes, nose, mouth, feet and hands to prevent profiling based on age, sex, race, color, etc. The multi-sensor device 1 or other depth sensor may detect activities within a detection range of a sensor device or multi-sensor device 1.

The optical privatizing device 100 may be configured to filter incident illumination from the scene before image capture. In an embodiment, the optical privatizing device 100 privatizes a scene before image capturing or sensing of the scene. Therefore, sensed data that is stored is privatized before storage. The privatized data may not be un-privatized with software. Thus, sensitive information is blurred while capturing a portion of the signal that is relevant to the computer vision task but with privacy. Thus, the optical privatizing device 100 allows for privatized full-body motion tracking. For example, for a Microsoft® Kinect® device, motion tracking is maintained but with privacy and maintained gaming performance. The motion tracking function may be used to detect other activities such as movements in a field of view, traffic, falls in clinics, etc.

In operation, the optical privatizing device 100 may be used with or without the panel 120. When the multi-sensor device 1 is turned off, the panel 120 may be installed so that RGB images cannot be captured if the camera is remotely turned on or without the permission of residents or users in the range of the RGB camera. The lens 130 remains in-line with the depth sensor.

By way of non-limiting example, the panel 120 may be removed during gaming but replaced when finished even if the multi-sensor device 1 is on. The optical privatizing device 100 may be slid along the housing of the multi-sensor device 1 so that the camera lens and depth sensor are not obstructed by the privatizing device 100. Nonetheless, the optical privatizing device 100 may remain in place at all times to prevent RGB images from being captured and to blur the sensed images or depth information through the lens 130.

Figure 2A:
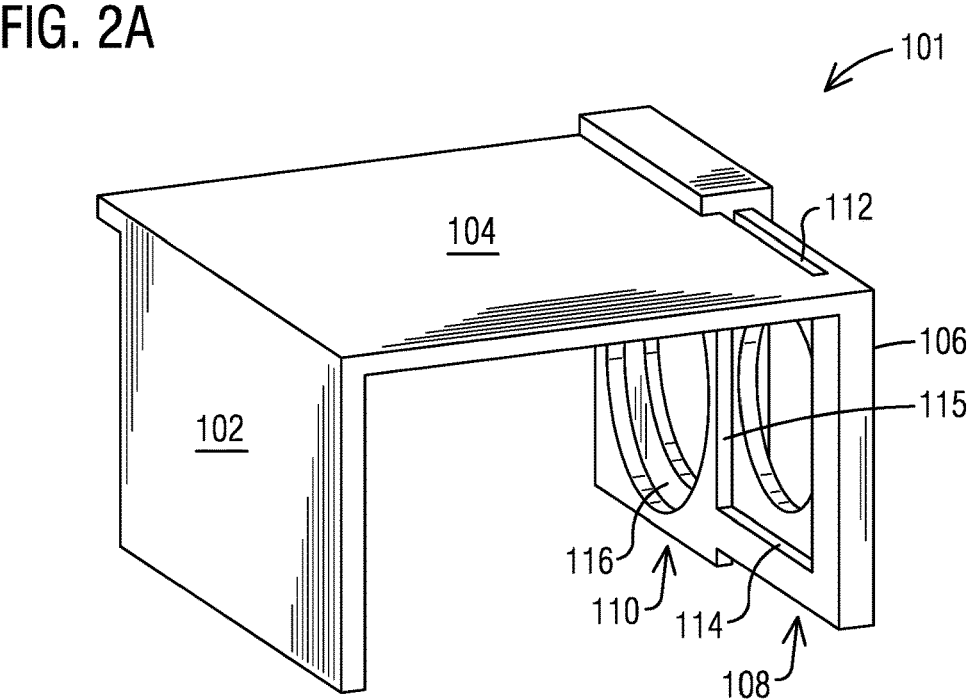
FIG. 2A illustrates a side perspective view of a frame of the optical privatizing device.
Figure 2B:
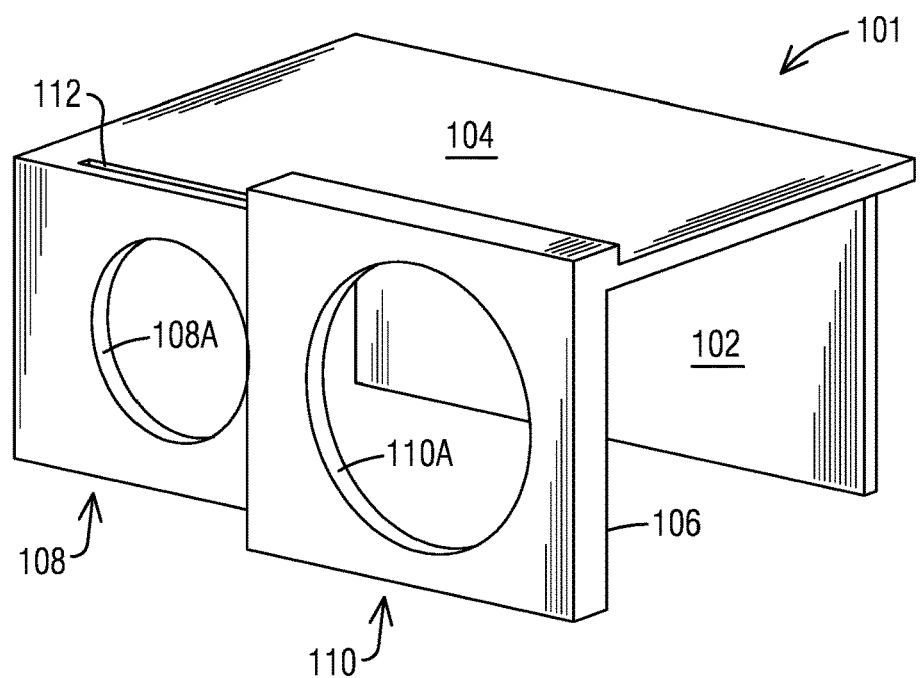
FIG. 2B illustrates a front perspective view of the frame of the optical privatizing device.

FIGS. 2A and 2B illustrate first and second perspective views of frame 101 of the optical privatizing device 100. The frame 101 may be configured to have a generally U shape dimensioned to slide over a generally boxed shaped profile whether square or rectangular of the housing for the multi-sensor device 1. In an embodiment, the multi-sensor device 1 may be a Kinect® device. The shape is generally rectangular shape. In lieu of a U-shaped profile, the frame 101 of the optical privatizing device 100 may have a J shape. The image privatizing device 100 may have a variety of shapes including rectangle, square or other shapes that allows the image privatizing device 100 to be installed on a housing of at least one depth sensor or multi-sensor device 1.

The frame 101 may include a plurality of panels. For example, the frame 101 may include a first panel 102, a second panel 104 and a third panel 106. The third panel 106 may comprises a first section 108 and a second section 110. The first section 108 may be adjacent to the second section 110. The second section 110 may be thicker than the first section 108.

The first section 108 may include the light passage or aperture 108A. The second section 110 may include the light passage or aperture 110A. The second panel 104 may comprise a slot 112 arranged above the passage or aperture 108A. The slot 112 may comprise an elongated opening for receipt of the panel 120. As best seen in FIG. 2A, a rear surface of the first section 108 has a ledge 114 below the aperture 108A. In operation, the panel 120 may be inserted through slot 112 and rest on ledge 114. In an embodiment, the first section 108 may comprise a panel holder or channel 115 dimensioned to receive the panel 120 and maintain the panel 120 within the first section 108. By way of non-limiting example, the holder or channel 115 may include side walls and the ledge 114 to support the panel 120 therein.

The second section 110 may include a cavity 116. The cavity 116 of the second section 110 may be configured to have attached thereto or supported therein blurring lens 130.

The first panel 102 may have one end coupled to one end of a second panel 104. The other end of the second panel 104 is coupled to one end of the third panel 106. The third panel 106 is constructed and arranged to align the aperture 108A and aperture 110A in the line-of-sight of the RGB camera and the depth sensor, respectively, of multi-sensor device 1. The distance between aperture 108A and aperture 110A will vary based on the arrangement of the camera lens and the depth sensor lens.

The optical privatizing device 100 may be used with a device with a single sensor such as a depth sensor or time-of-flight depth sensor. Thus, the optical privatizing device 100 may include just one section (i.e., the second section 110). In other words, the first section 108 including the removable panel 120 may be omitted for those devices that do not include another sensor such as a camera or other image capturing device.

The image privatizing device 100 may include two sections, however, both sections may include the blurring optical lens, each for a respective different depth sensor.

Privacy Preserving Depth Sensing and Motion Tracking.

The optical privatizing device 100 may be configured to be an add on accessory for the Microsoft® Kinect® products, such as without limitation, Kinect® V2 and that allows accurate depth sensing and motion tracking while maintaining privacy. In an embodiment, the performance of the Microsoft® Kinect gaming device is maintained with privacy such that no images with identifiable features in RGB or IR are captured and saved thus privatizing the operation of the Microsoft® Kinect® products.

Figure 3A:
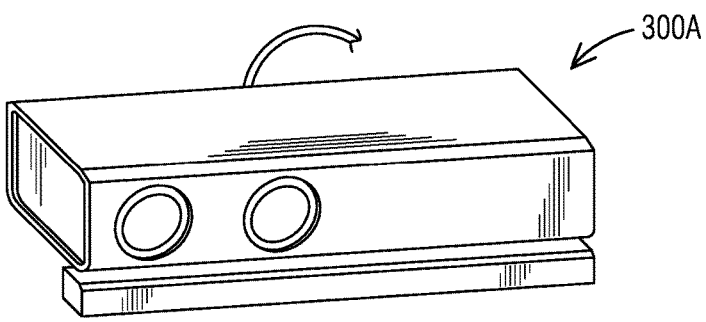
FIG. 3A illustrates a conventional multi-sensor device.
Figure 3B:
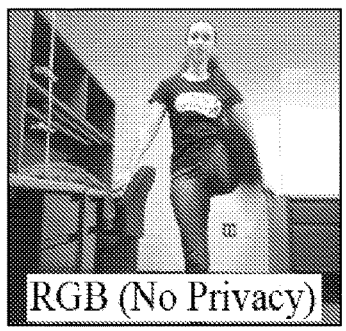
FIG. 3B illustrates a RGB image captured by the multi-sensor device of FIG. 3A.
Figure 3C:
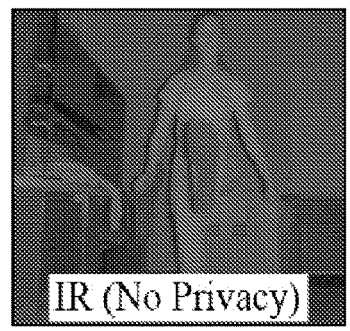
FIG. 3C illustrates an infrared (IR) image captured by the multi-sensor device of FIG. 3A.
Figure 3D:
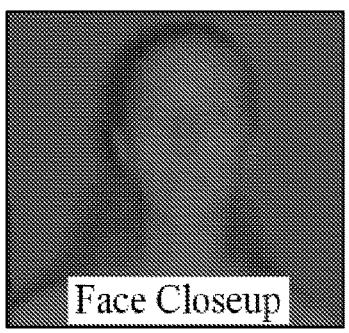
FIG. 3D illustrates a close up IR image captured by the multi-sensor device of FIG. 3A.
Figure 3E:
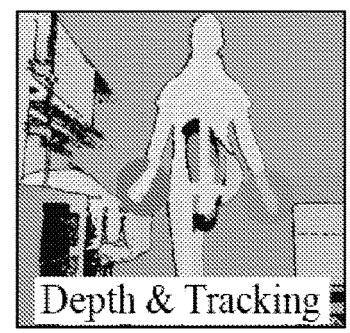
FIG. 3E illustrates an image representative of depth and tracking by the multi-sensor device of FIG. 3A.
Figure 4A:
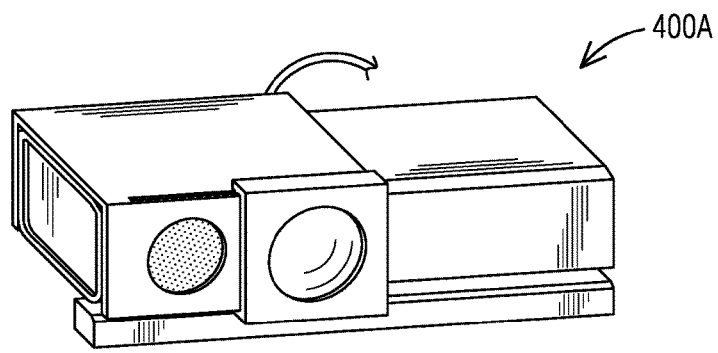
FIG. 4A illustrates the optical privatizing device installed on a multi-sensor device.
Figure 4B:
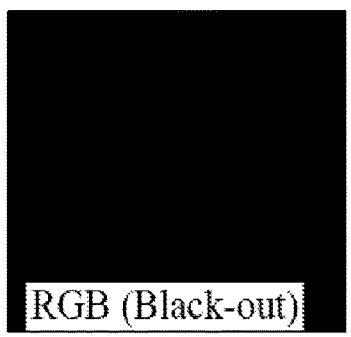
FIG. 4B illustrates a blanked-out image caused by the optical privatizing device.
Figure 4C:
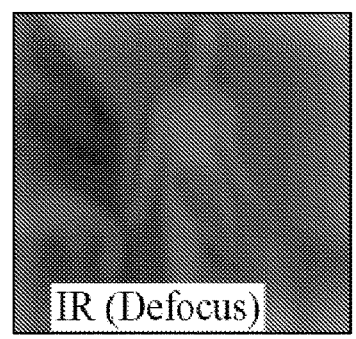
FIG. 4C illustrates a de-focused infrared (IR) image optically captured by the multi-sensor device via the optical privatizing device.
Figure 4D:
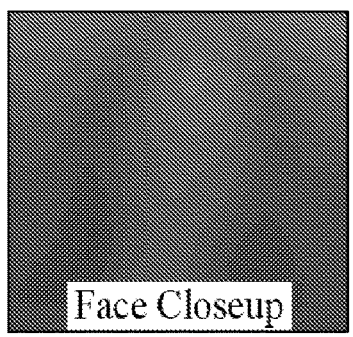
FIG. 4D illustrates a blurred close up IR image captured by the multi-sensor device through the blurring lens of the optical privatizing device.
Figure 4E:
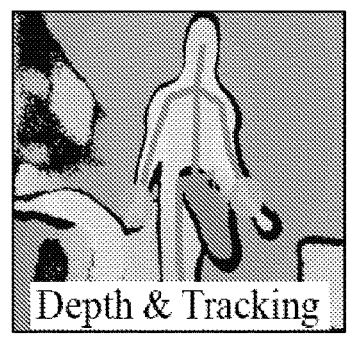
FIG. 4E illustrates an image representative of depth and tracking by the multi-sensor device with the optical privatizing device installed.

As shown in FIGS. 3A-3E, without the optical privatizing device 100 installed on a Microsoft® Kinect device 300A faces can clearly be identified in both the RGB image 300B (FIG. 3B) and IR sensor images 300C and 300D (FIGS. 3C and 3D). In contrast, as shown in FIGS. 4A-4D, the optical privatizing device 100 is installed on a Microsoft® Kinect device 400A and performs optical black-out for the RGB sensor images 400B (FIG. 4B) and optical defocus for the IR sensor images 400C and 400D (FIGS. 4C and 4D). Lastly, FIGS. 3E and 4E illustrate that the native Kinect® tracking software from Microsoft® performs accurate depth sensing and motion tracking without and with the optical privatizing device.

Optical Privacy with a Time-of-flight Depth Sensor

The image privatizing device 100 may be a 3D printed privacy sleeve such as without limitation configured for installation on the Microsoft® Kinect® V2. The image privatizing device 100 may optically de-identify faces via a defocused convex IR lens (i.e., lens 130) in front of and in-line with the time-of-flight depth sensor and a printed cover (i.e., panel 120) positioned in front of the lens of the RGB camera. The defocus of the lens 130 may affect the infrared (IR) amplitude image while leaving the phase (or depth information) essentially intact. By way of non-limiting example, the depth information may remain intact when the scene geometry is relatively smooth; i.e. the phasors averaged by the defocus kernel are similar. The panel 120 may be removable. In an embodiment, the frame 101 may omit the aperture 108A.

By way of non-limiting example, the defocus specifications for lens 130 may include $\Sigma=\{\Delta, \sigma, R, \Theta, \rho\}$ where $\Delta$ is the angular error tolerance; $\sigma$ (standard deviation) is the desired defocus given in terms of a Gaussian blur on an image of resolution R and field of view (FOV) $\Theta$; and $\rho$ is the length of the biggest target feature that is to be degraded by defocus blurring. For example, for a sensor designed to de-identify faces, $\rho$ may be the size in millimeters (mm) of large facial features, such as eyes. The field of view and resolution may be are necessary to relate standard deviation, a dimensionless quantity, to an angular support defocus blur. The defocus may use lensless sensor dimensions and characteristics, such as effective field of view (eFOV) and angular support $\omega_o$.

The approximation of a Gaussian filter of standard deviation $\sigma$ by a box blur corresponding to $2\sigma$, then, for defocus specifications $\Sigma$, the angular support $\omega_o$ is defined as $$\omega_o = 2\sigma(\Theta/R). \quad \text{Equation (1)}$$

The lens may be miniaturized with Optical Blurring for a sensor. The minimum may be defined as $z_{min}$, which is the minimum distance between the depth sensor and the target in order for the sensor to preserve the degree of privacy specified by the defocus specifications wherein $z_{min}$ is a function of the working volume of the depth sensor. The parameter may be defined by, $$z_{min} = \rho/(2 \tan(\omega_o/2)). \quad \text{Equation (2)}$$

In an embodiment, the equations above with the input defocus specifications include $\Sigma=\{\Delta, \sigma, R, \Theta, \rho\}$, are used to compute Equation (1) and may apply the method described in the paper titled "Towards Wide-angle Micro Vision Sensors" [1]; and as described in U.S. Pat. No. 9,176,263 incorporated herein by reference. Plus the Equation (2) to output the optimal design with maximum eFOV, $\Pi=\{u, d, z_{min}\}$. The greek letter ($\Pi$) Pi may be defined to be the optimal design with the maximum eFOV.

The optical privatizing device 100 as well as body tracking results under defocus (privatization) are shown. In the illustration, as a frame of reference a subject has a distance of 1.7 meters (m) from the Microsoft® Kinect® V2. The angular support $\omega_o$ of the IR sensor with the sleeve was 3°, which corresponds to lensless parameters u is the distance between the lens and the light-sensitive sensor in the camera and d is the size of the aperture or opening through which light enters the camera. u=10 mm, d=0.5 mm, a minimum distance (d), $z_{min}$=1.5 m for degrading features of 8 cm and an eFOV of 64.7° for angular error tolerance Δ=1°. The eFOV is the effective field of view where the user defined parameters in equations (1) and (2) are adhered to. The sensor's effective field of view (eFOV) is defined as a set of viewing directions for which the corresponding angular supports are within a user-defined range.

FIG. 5 illustrates a computer-implemented method 500 of privatizing activity detection before image capturing. The method 500 is configured to privatize images prior to the image being captured or saved. The privatizing of the image may occur by blurring or de-focusing (optically modifying) the image through a lens so that the light passing through the lens is blurred or defocused to a privatization blur level. In an embodiment, the blurring or de-focusing may be prior to image sensing or image storing. The privatization is performed without software manipulation of the captured data. The method 500 may begin at block 502. At block 504, passing light through a lens where the light is "optically modified." The lens allows light from the scene to be collected by the optics and then distributed by the same optics across the light-sensitive sensor in the camera, in a way that preserves privacy. In an embodiment, the amount of optical modification may blur or defocus light to a privatizing blur level. The privatizing blur level may produce high intensity blobs within the IR image. At block 506, sensing the optically modified light by a depth sensor (i.e., time-of-flight depth sensor) to create privatized sensed data. At block 508, processing the privatized sensed data for a predetermined activity in the range of the depth sensor. The activity detection depends on the phase information (depths) which is not affected. At block 510, the data is logged (stored in memory). However, the privatized sensed data is privatized before storage into any memory device. At block 512, determine whether the activity has occurred. At block 514, a report of the results may generated. At block 516, the method 500 ends.

The method 500 may repeat (not shown) while the activity is taking place. The report in block 514 may be delayed until an end of a game, other activities or at other times.

The method 500 may include an optional block 518 (shown in dashed lines) to blanking-out the RGB captured image simultaneously during the blocks of 504-514. The blanking-out block may be changed to loop into block 510 or 512. The block may be omitted for devices with no camera or RGB sensor.

By way of non-limiting example, Microsoft®Kinect® includes software to detect depth and motion tracking. The performance is maintained so that the games may be played while the optical privatizing device 100 is installed.

In an embodiment, the privatizing blur level may render any captured or sensed images from a depth sensor or time-of-flight depth sensor to be profile neutral such that the sex, age, race, and color is un-identifiable. Thus, any activity being sensed and tracked may be profile neutral and private such that the identity of a subject is not captured in memory and rendered unidentifiable.

The privatizing level (defocusing or blurring) affects the infrared (IR) amplitude image or sensed information such that high intensity blobs are created. The high intensity blobs may be identified by light differences surrounding a blob as best seen in FIGS. 4C and 4D. Generally, the privatized image data may be represented as is high intensity blobs in the IR images.

In an embodiment, the privatizing blur level may include de-identifying objects with a thermal signature such as without limitation vehicles with the engine running.

Detected activities may include movement in an area in a room; falls in an area; traffic along or through a specific road or tunnel.

Figure 6:
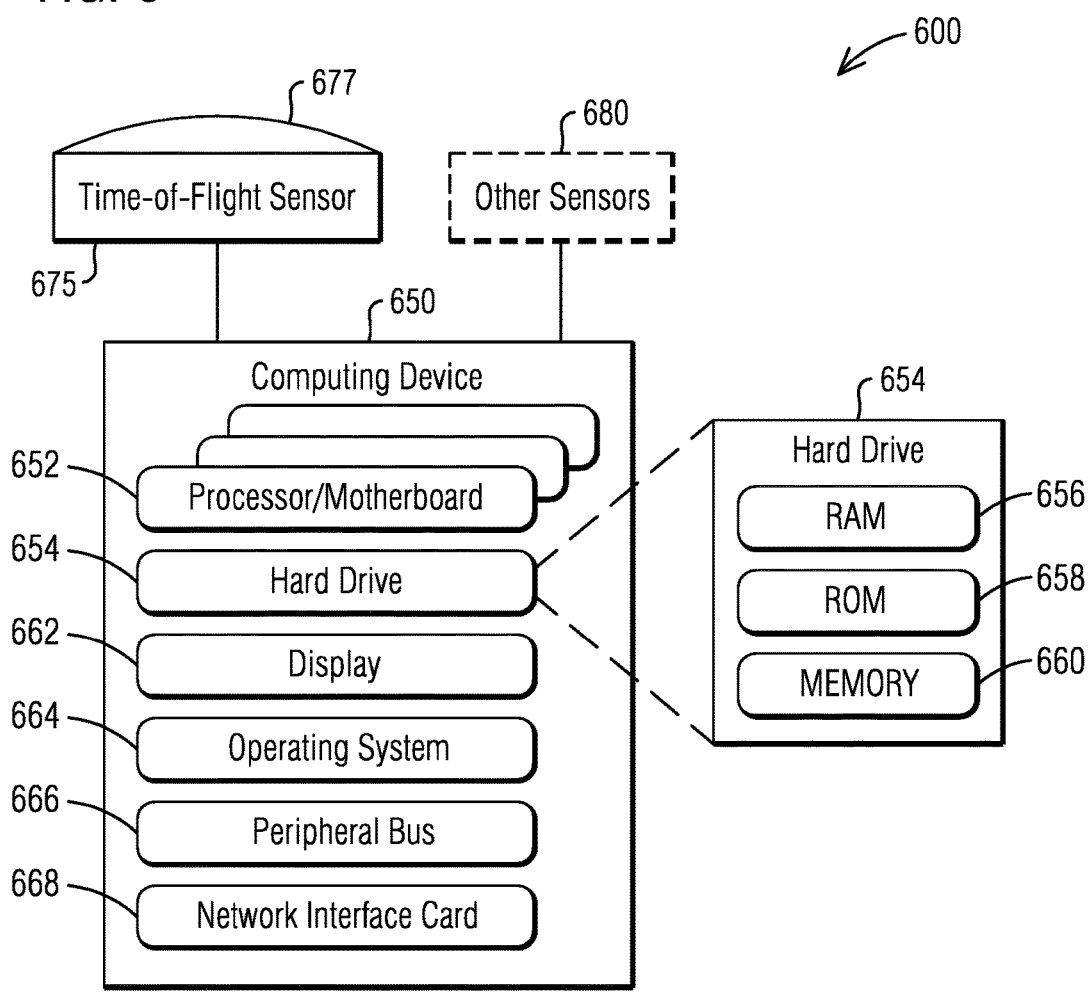
FIG. 6 illustrates a block diagram of an image privatizing system using optical privatization.

FIG. 6 illustrates a block diagram of an image privatizing system 600. The image privatizing system 600 may allow activities to be detected without any profiling based on age, sex, race, color, etc. in a predetermined location, where the predetermined location is within a detection range of at least one sensor device.

The system 600 may include, in a basic configuration, a time-of-flight depth sensor 675 with a blurring lens 677 and a computing device 650. The sensor 675 and blurring lens 677 may be an optical privatizing sensor device. The system 600 may optionally include other sensors or cameras 680. The camera may be blanked out if present such as shown in FIG. 1B. The computing device 650 may include any type of stationary computing device or a mobile computing device. A mobile computing device may include a smart phone, cellular phone, tablet, laptop, iPad, or other camera-enabled or video-enabled mobile computing device.

Computing device 650 may include one or more processors 652 and system memory in hard drive 654. Depending on the exact configuration and type of computing device, system memory may be volatile (such as RAM 656), non-volatile (such as read only memory (ROM 658), flash memory 660, and the like) or some combination of the two. System memory may store operating system 664, one or more applications, and may include program data for performing process 500. The computing device 650 may carry out one or more blocks of process 500. Computing device 650 may also have additional features or functionality. For example, computing device 650 may also include additional data storage devices (removable and/or non-removable) such as, for example, magnetic disks, optical disks, or tape. Computer storage media may include volatile and non-volatile, non-transitory, removable and non-removable media implemented in any method or technology for storage of data, such as computer readable instructions, data structures, program modules or other data. System memory, removable storage and non-removable storage are all examples of computer storage media. Computer storage media includes, but is not limited to, RAM, ROM, Electrically Erasable Read-Only Memory (EEPROM), flash memory or other memory technology, compact-disc-read-only memory (CD-ROM), digital versatile disks (DVD) or other optical storage, magnetic cassettes, magnetic tape, magnetic disk storage or other magnetic storage devices, or any other physical medium which can be used to store the desired data and which can be accessed by computing device. Any such computer storage media may be part of device.

Computing device 650 may also include or have interfaces for input device(s) (not shown) such as a keyboard, mouse, pen, voice input device, touch input device, etc. The computing device 650 may include or have interfaces for connection to output device(s) such as a display 662, speakers, etc. The computing device 650 may include a peripheral bus 666 for connecting to peripherals. Computing device 650 may contain communication connection(s) that allow the device to communicate with other computing devices, such as over a network or a wireless network. By way of example, and not limitation, communication connection(s) may include wired media such as a wired network or direct-wired connection, and wireless media such as acoustic, radio frequency (RF), infrared and other wireless media. The computing device 650 may include a network interface card 668 to connect (wired or wireless) to a network.

Computer program code for carrying out operations described above may be written in a variety of programming languages, including but not limited to a high-level programming language, such as C or C++, for development convenience. In addition, computer program code for carrying out operations of embodiments described herein may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed Digital Signal Processor (DSP) or microcontroller. A code in which a program of the embodiments is described can be included as a firmware in a RAM, a ROM and a flash memory. Otherwise, the code can be stored in a tangible computer-readable storage medium such as a magnetic tape, a flexible disc, a hard disc, a compact disc, a photo-magnetic disc, a digital versatile disc (DVD).

The embodiments may be configured for use in a computer or a data processing apparatus which includes a memory, such as a central processing unit (CPU), a RAM and a ROM as well as a storage medium such as a hard disc.

The "step-by-step process" for performing the claimed functions herein is a specific algorithm, and may be shown as a mathematical formula, in the text of the specification as prose, and/or in a flow chart. The instructions of the software program create a special purpose machine for carrying out the particular algorithm. Thus, in any means-plus-function claim herein in which the disclosed structure is a computer, or microprocessor, programmed to carry out an algorithm, the disclosed structure is not the general purpose computer, but rather the special purpose computer programmed to perform the disclosed algorithm.

A general purpose computer, or microprocessor, may be programmed to carry out the algorithm/steps for creating a new machine. The general purpose computer becomes a special purpose computer once it is programmed to perform particular functions pursuant to instructions from program software of the embodiments described herein. The instructions of the software program that carry out the algorithm/steps electrically change the general purpose computer by creating electrical paths within the device. These electrical paths create a special purpose machine for carrying out the particular algorithm/steps.

Unless otherwise defined, all terms (including technical and scientific terms) used herein have the same meaning as commonly understood by one of ordinary skill in the art to which embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In particular, unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such data storage, transmission or display devices.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another.

While various disclosed embodiments have been described above, it should be understood that they have been presented by way of example only, and not limitation. Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Therefore, the breadth and scope of the subject matter provided herein should not be limited by any of the above explicitly described embodiments. Rather, the scope of the embodiments should be defined in accordance with the following claims and their equivalents.

REFERENCES

1. Sanjeev J. Koppal et al., "Towards Wide-angle Microvision Sensors," IEEE Transactions on Pattern Analysis and Machine Intelligence, vol. 35, No. 12, December 2013.

The teachings of the references and patents cited throughout the specification are incorporated herein in their entirety by this reference to the extent they are not inconsistent with the teachings herein.

We claim:
1. A device comprising:
    a removable frame removably attachable to a sensor housing; and
    a blurring lens coupled to the removable frame and configured to optically modify light passing to a depth sensor wherein the optical modified light has a privatizing blur level to neutralize a profile of an object sensed by the depth sensor within a working volume of the depth sensor to an un-identifiable state while maintaining a depth parameter sensed by the depth sensor;
    wherein the removable frame comprises:
    a first side having a thickness, the first side including:

a first section having a first aperture having a closed state and an open state; and a second section having a second aperture;

a second side perpendicularly coupled to an upper end of the first side;

a slot formed in the second side in proximity to the first section;

a channel in the first section; and a removable panel removably coupled in the slot and supported in the channel to close the first aperture in the closed state; wherein in the closed state the panel blanks out light to the first aperture while the blurring lens simultaneously optically modifies the light passing to the depth sensor to the privatizing blur level, wherein:

the depth sensor is included in a video gaming device;

the frame being configured to be attached to the video gaming device such that the first aperture is in-line with a red, green, blue (RGB) sensor of the video gaming device; and the device being devoid of electronic components.

2. The device of claim 1, wherein the first section and the second section are side-by-side such that the first aperture is positioned at a distance from the second aperture, the first aperture has a circumference that allows light to pass through the first aperture, in the open state, to a lens of the RGB sensor.

3. The device of claim 1, further comprising the depth sensor (675), wherein the blurring lens (677) to de-identify a thermal emitting object.

4. The device of claim 1, wherein the blurring lens (130) being a function of a Gaussian Blur standard deviation factor to cause defocus blurring of the light passing through the blurring lens.

5. The device of claim 1, wherein the blurring lens (130) being a function of a length of a target feature of the object degraded by the defocus blurring to neutralize the profile of the object.

6. The device of claim 5, wherein the blurring lens (130) to de-identify faces and the length of the target feature includes a facial feature.

7. A system comprising:

an optical privatizing device; and a multi-sensor device having a depth sensor with a working volume and a red, green, blue (RGB) sensor, the optical privatizing device includes:

a frame comprising first aperture to pass light to the RGB sensor and a second aperture;

a blurring lens coupled to the second aperture and to optically modify light to the depth sensor to a privatizing blur level to neutralize a profile of an object sensed by the depth sensor within the working volume to an un-identifiable state while maintaining a depth parameter sensed by the depth sensor; and a panel selectively coupled to the frame to close the first aperture to blank-out the RGB sensor of the multi-sensor device while the blurring lens simultaneously optically modifies the light passing through the blurring lens, wherein the frame comprises:

a first side having a thickness, the first side including:

a first section having the first aperture having a closed state and an open state; and a second section having the second aperture; a second side perpendicularly coupled to an upper end of the first side;

a slot formed in the second side in proximity to the first section;

a channel in the first section; and wherein the panel removably coupled in the slot and supported in the channel to close the first aperture in the closed state; wherein, in the closed state, the panel blanks out the light to the RGB sensor.

8. The system of claim 7, wherein the first section and the second section are side-by-side such that the first aperture is positioned at a distance from the second aperture, the first aperture has a circumference that allows light to pass through the first aperture, in the open state, to a lens of the RGB sensor.

9. The system of claim 7, wherein the blurring lens (130) being a function of a Gaussian Blur standard deviation factor to cause defocused blurring of the light passing through the blurring lens.

10. The system of claim 7, wherein the blurring lens (130) being a function of a length of a target feature of the object degraded by the defocus blurring to neutralize the profile of the object.

11. The system of claim 10, wherein the blurring lens (130) to de-identify faces and the length of the target feature includes a facial feature and the optical privatizing device (100) is devoid of electronic components.

12. The system of claim 7, wherein:

the depth sensor is an infrared (IR) time-of-flight depth sensor;

the blurring lens (130) to de-identify a thermal emitting object; and the optical privatizing device (100) is devoid of electronic components.

* * * * *